United States Patent
Sullivan et al.

(10) Patent No.: US 11,794,659 B1
(45) Date of Patent: Oct. 24, 2023

(54) MODULAR SPARE TIRE ACCESSORY MOUNTING SYSTEM

(71) Applicants: Royce Sullivan, Temecula, CA (US); Jerry Sullivan, Temecula, CA (US)

(72) Inventors: Royce Sullivan, Temecula, CA (US); Jerry Sullivan, Temecula, CA (US)

(*) Notice: Subject to any disclaimer, the term of this patent is extended or adjusted under 35 U.S.C. 154(b) by 0 days.

(21) Appl. No.: 18/213,750

(22) Filed: Jun. 23, 2023

Related U.S. Application Data

(60) Provisional application No. 63/354,815, filed on Jun. 23, 2022.

(51) Int. Cl.
*B60R 9/06* (2006.01)
*B62D 43/02* (2006.01)

(52) U.S. Cl.
CPC ............... *B60R 9/06* (2013.01); *B62D 43/02* (2013.01)

(58) Field of Classification Search
CPC ........................................................ B60R 9/45
See application file for complete search history.

(56) References Cited

U.S. PATENT DOCUMENTS

| | | |
|---|---|---|
| 1,798,239 A | 3/1931 | Welker |
| 1,834,861 A | 12/1931 | Nelson |
| 3,828,879 A | 8/1974 | Harkey |
| 4,132,336 A | 1/1979 | Leinaar |
| 4,174,797 A | 11/1979 | Yasue |
| 4,771,926 A | 9/1988 | Anderson |
| 4,948,021 A | 8/1990 | Murphy |
| 5,085,360 A * | 2/1992 | Fortune ............... B60R 9/10 224/42.21 |
| 5,203,479 A | 4/1993 | Ucas |
| 5,228,608 A | 7/1993 | Stout, III |
| 5,462,211 A | 10/1995 | Versoll |
| 5,806,736 A | 9/1998 | Kincart |
| 6,910,669 B2 | 6/2005 | Gates |
| 7,331,494 B2 * | 2/2008 | Huang ............... B60R 9/10 224/924 |
| 7,478,723 B2 * | 1/2009 | Spater ............. B62D 43/005 206/304.1 |
| 7,533,789 B1 | 5/2009 | Seely |
| 7,597,222 B2 | 10/2009 | Bishop |
| 7,708,175 B2 * | 5/2010 | Edwards ............ B62D 43/10 224/42.14 |
| 7,845,895 B2 | 12/2010 | Barie |

(Continued)

*Primary Examiner* — Brian D Nash
(74) *Attorney, Agent, or Firm* — QUICKPATENTS, LLC; Kevin Prince

(57) ABSTRACT

An accessory mounting system for a spare tire and at least one ratchet strap includes a platform having a plurality of mounting apertures formed therethrough. A pair of wedge brackets, each fixed with the platform, is further adapted at an inside arched surface thereof for fixing against the circumferential tread of the spare tire. An outside surface of each mounting bracket includes a mounting hole pattern for attaching various accessories thereto. In use, with the at least one flexible strap traversing the wedge brackets at two or more strap slots formed therein, the ratchet strap is actuated to tighten the accessory mounting system to the spare tire. Preferably, the accessory mounting system further includes a tire face mounting plate with a mounting hole pattern for fixing various accessories thereto.

13 Claims, 8 Drawing Sheets

(56) References Cited

U.S. PATENT DOCUMENTS

| | | | |
|---|---|---|---|
| 7,922,048 B2 * | 4/2011 | Smith | B60Q 1/2661 |
| | | | 296/37.2 |
| 8,690,033 B2 | 4/2014 | Harriton | |
| 9,623,807 B2 | 4/2017 | Singleton | |
| 9,802,659 B2 * | 10/2017 | Anderson | B62D 43/02 |
| 10,406,989 B2 | 9/2019 | Kruse | |
| 10,479,284 B1 | 11/2019 | Salyer | |
| 10,493,924 B2 | 12/2019 | Samouce | |
| 10,625,685 B1 * | 4/2020 | Gruener | B60R 19/38 |
| 10,858,050 B2 | 12/2020 | Headlee | |
| 11,110,976 B2 | 9/2021 | Fischer | |
| 11,230,231 B1 | 1/2022 | Storer, II | |
| 2005/0258200 A1 | 11/2005 | Scola | |
| 2006/0102666 A1 | 5/2006 | Godding | |
| 2006/0243769 A1 | 11/2006 | Lovey | |
| 2009/0047108 A1 * | 2/2009 | Barie | B62D 43/002 |
| | | | 414/427 |
| 2011/0101049 A1 | 5/2011 | Rivers | |
| 2012/0031934 A1 | 2/2012 | Danze | |
| 2020/0307465 A1 * | 10/2020 | Williams | B60R 9/10 |

* cited by examiner

MODULAR SPARE TIRE ACCESSORY MOUNTING SYSTEM

CROSS-REFERENCE TO RELATED APPLICATIONS

This application claims the benefit of U.S. Provisional Patent Application 63/354,815, filed on Jun. 23/2022, and is incorporated herein by reference.

STATEMENT REGARDING FEDERALLY SPONSORED RESEARCH AND DEVELOPMENT

Not Applicable.

FIELD OF THE INVENTION

This invention relates to vehicle accessories, and more particularly to a spare tire accessory mounting system.

BACKGROUND

Exposed spare tires on vehicles are typically well-secured to the vehicle, but provide little additional use other than that of their intended purpose of being readily accessible if needed. Some prior art products aim to provide means of attaching items to such a spare tire, but typically such products are item specific, meaning that only certain items can be attached to a spare tire with such products.

Therefore, there is a need for a system that provides for securing a variety of objects and accessories to an exposed spare tire of a vehicle. Such a needed invention would be well-secured to the spare tire and would not allow movement of the system components or the items being held thereby. Such a needed invention would allow for a wide variety of configurations and allow for versatile arrangement of objects and accessories to the system. Such a needed invention would be relatively easy to install on the spare tire and remove. The present invention accomplishes these objectives.

SUMMARY OF THE INVENTION

The present device is an accessory mounting system for a spare tire that is attached to a vehicle and exposed. The spare tire is of the type having a circumferential tread, a front side, and a back side. The accessory mounting system is for use with at least one ratchet strap that includes a flexible strap and a ratcheting mechanism adapted to tighten the flexible strap around the spare tire.

The accessory mounting system includes a platform that has a top surface, a bottom surface, and a peripheral edge. The platform further includes a plurality of mounting apertures formed therethrough.

The accessory mounting system further includes a pair of wedge brackets, each adapted at a first end thereof for fixing with two or more of the mounting apertures of the platform. Each wedge bracket is further adapted at an inside arched surface thereof for fixing against the circumferential tread of the spare tire. Each wedge bracket further includes a second end opposing the first end, and two or more strap slots traversing an outside surface of the wedge bracket.

In use, with the at least one flexible strap traversing the wedge brackets at the strap slots, the at least one flexible strap secures the wedge brackets and the platform to the spare tire. The ratcheting mechanism is then actuated to tighten the at least one flexible strap about the spare tire to tighten the accessory mounting system to the spare tire.

In preferred embodiments, the accessory mounting system further includes a pair of platform height mounting brackets fixed at a top end thereof with two or more of the mounting apertures of the platform, and fixed at two or more vertical slots thereof with the wedge brackets. As such, the height of the platform with respect to the two wedge brackets is adjustable.

In some embodiments, two additional of the wedge brackets are included, each additional wedge bracket inverted and mutually fixed at the second ends thereof. As such, the inside arched surfaces of each wedge bracket further engage the circumferential tread of the spare tire. In such embodiments, a mounting bracket may be fixed about the two second ends of the attached wedge brackets. The mounting bracket holds the wedge brackets together and provides a second mounting hole pattern that comprises a plurality of the mounting holes, for attaching to various accessories.

Each wedge bracket preferably further includes a fit adjustment plate pivotally attached within the wedge bracket at the inside arched surface thereof. Each fit adjustment plate includes a second inside arched surface that can be pivoted inwardly or outwardly to match the curvature of the circumferential tread of the spare tire.

Preferably the accessory mounting system further includes a tire face mounting plate that includes a front side, a rear side, and a peripheral edge that includes a top side, a bottom side, a left side, and a right side. The top side is fixed with the platform at one or more of the mounting apertures of the platform, so as to be positioned to substantially cover the front side of the spare tire. Preferably the front side and the rear side of the tire face mounting plate is shaped as an octagon.

The present invention is a system that secures a variety of objects and accessories to an exposed spare tire of a vehicle. The present system is well-secured to the spare tire and does not allow significant movement of the system components or the items being held thereby. The present invention allows for a wide variety of configurations and for versatile arrangement of objects and accessories to the system. The present invention is relatively easy to install on the spare tire and then remove. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
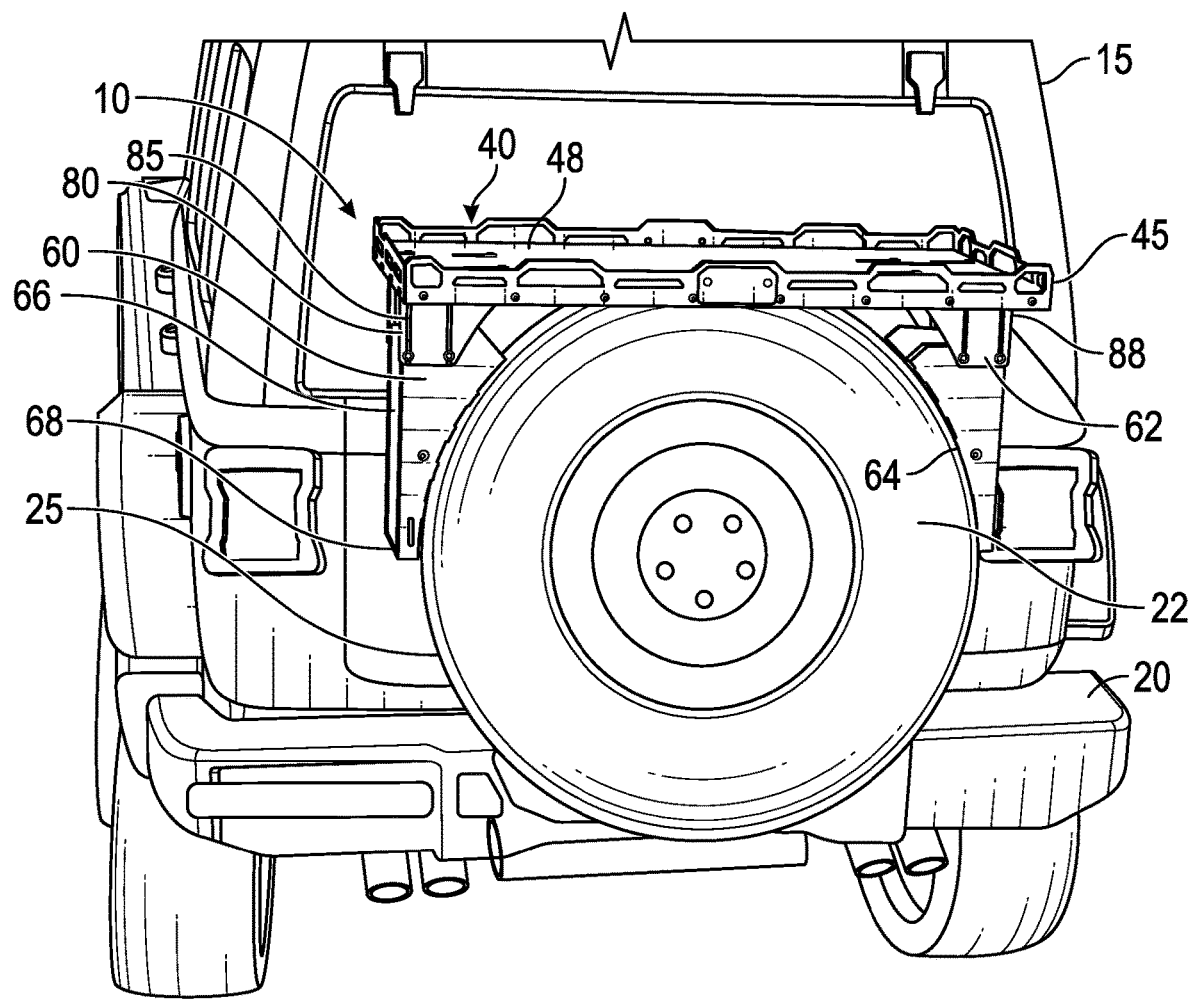
FIG. 1 is a front perspective view of a first embodiment of the invention.
Figure 2:
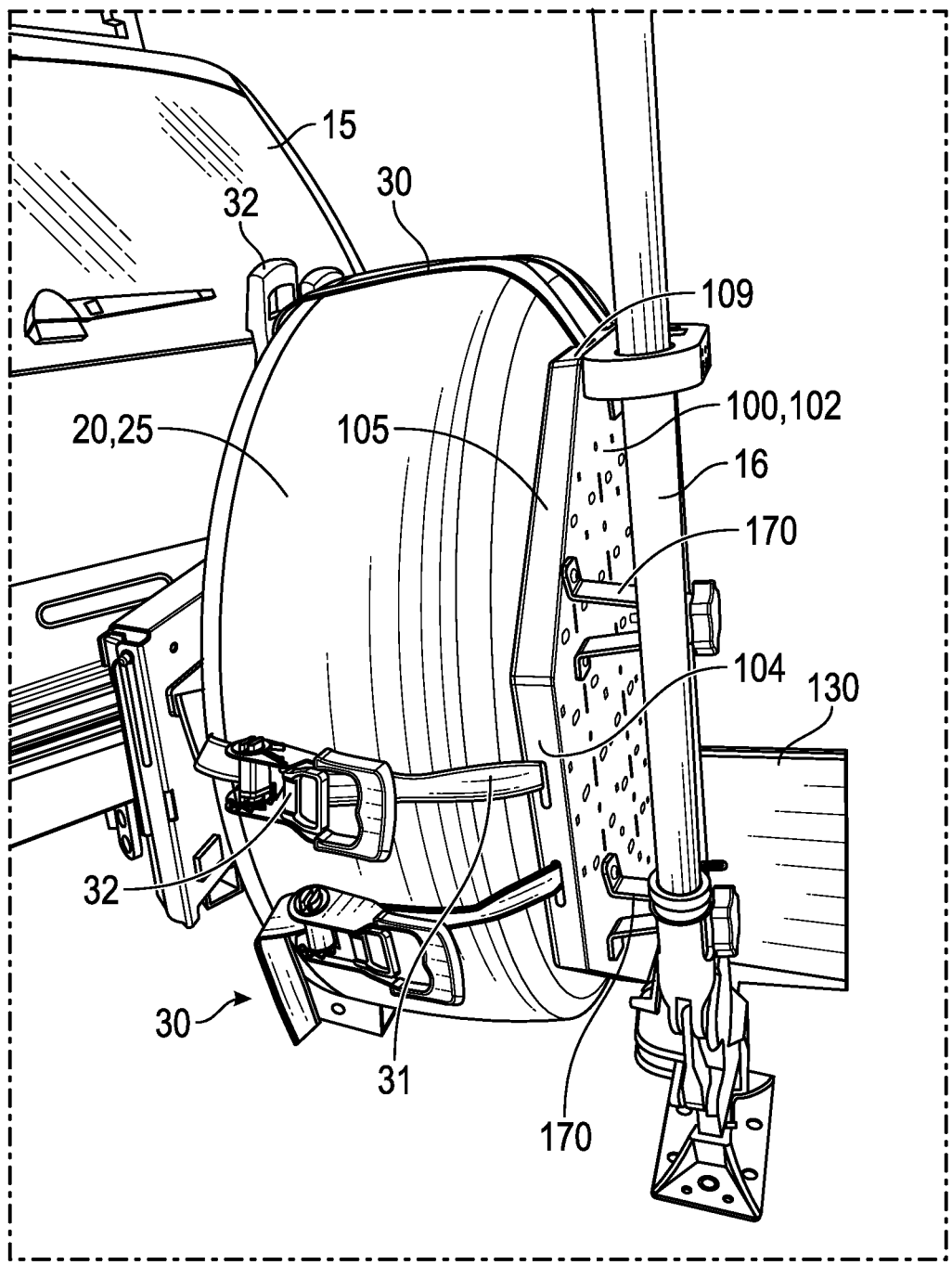
FIG. 2 is a side perspective view of a second embodiment of the invention.
Figure 3:
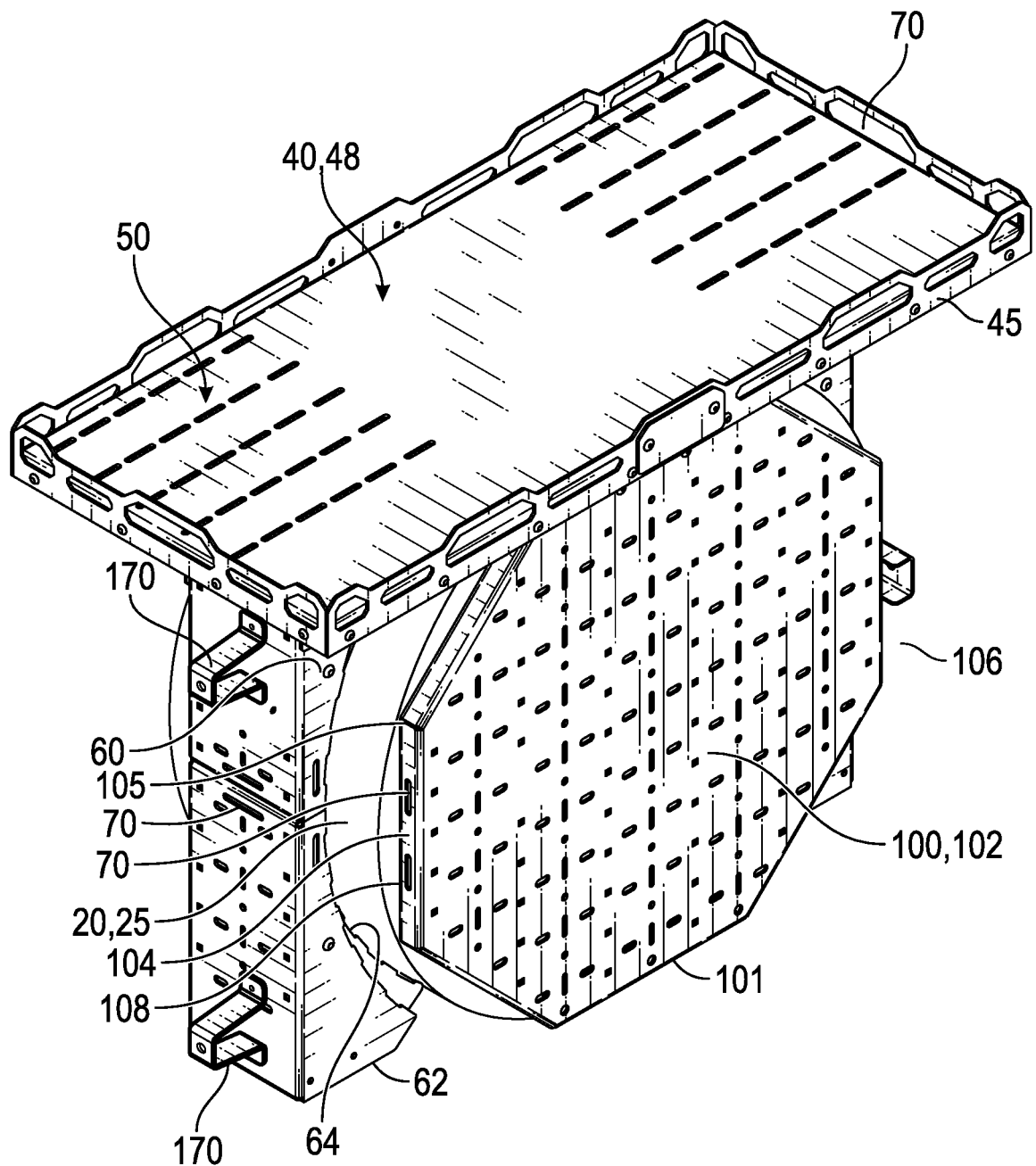
FIG. 3 is a top perspective view of the first embodiment with two additional wedge brackets for engaging the tire.
Figure 4:
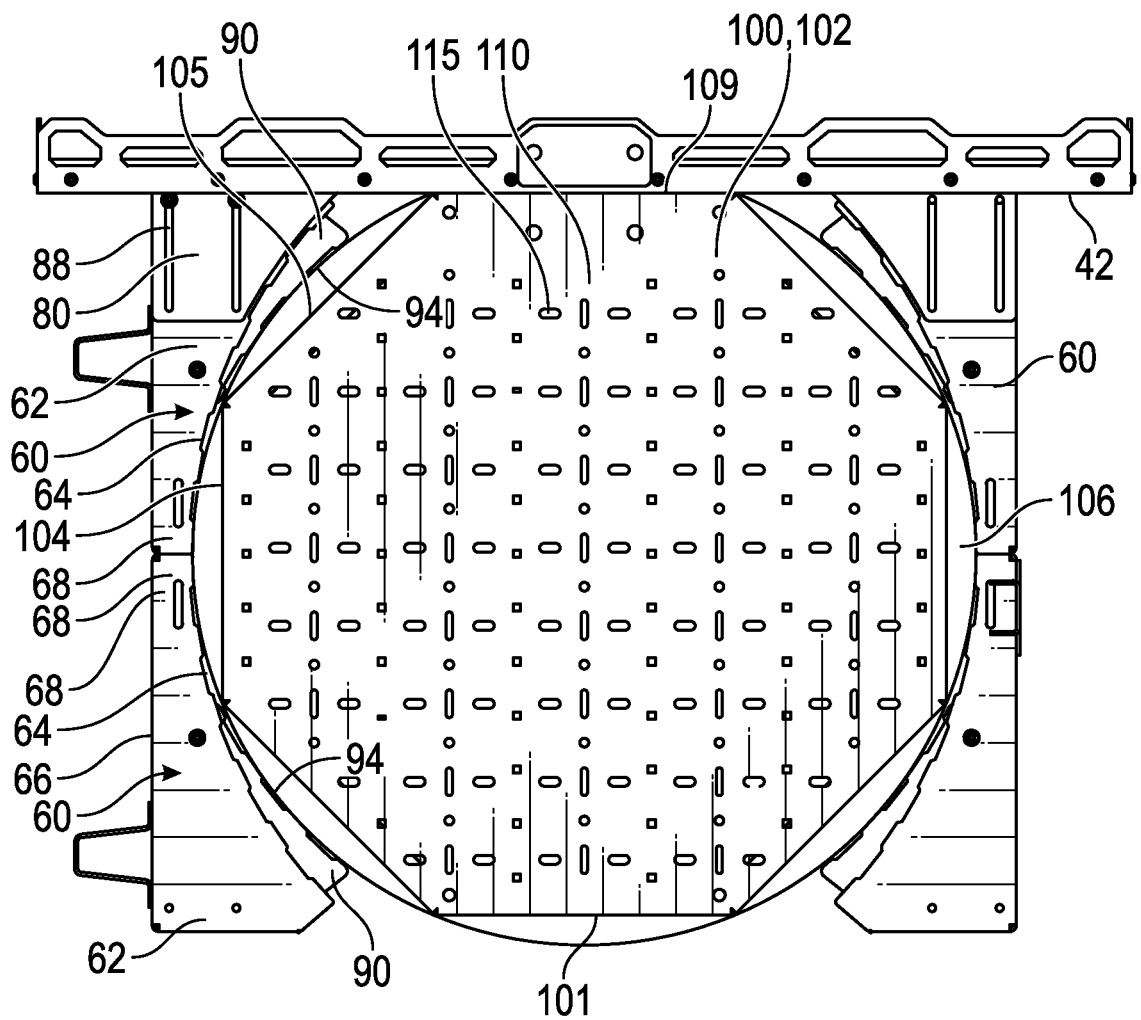
FIG. 4 is a front elevational view of the embodiment of FIG. 3.

FIGS. 1-4 illustrate an accessory mounting system 10 for a spare tire 20 that is attached to a vehicle 15 and exposed. The spare tire 15 is of the type having a circumferential tread 25, a front side 22, and a back side 28. The accessory mounting system 10 is for use with at least one ratchet strap 30 that includes a flexible strap 31 and a ratcheting mechanism 32 adapted to tighten the flexible strap 31 around the spare tire 20.

The accessory mounting system 10 includes a platform 40 that has a top surface 48, a bottom surface 42, and a peripheral edge 45. The platform 40 further includes a plurality of mounting apertures 50 formed therethrough.

The accessory mounting system 10 further includes a pair of wedge brackets 60, each adapted at a first end 62 thereof for fixing with two or more of the mounting apertures 50 of the platform 40. Each wedge bracket 60 is further adapted at an inside arched surface 64 thereof for fixing against the circumferential tread 25 of the spare tire 20. Each wedge bracket 60 further includes a second end 68 opposing the first end 62, and two or more strap slots 70 traversing an outside surface 66 of the wedge bracket 60.

In use, with the at least one flexible strap 31 traversing the wedge brackets 60 at the strap slots 70, the at least one flexible strap 31 secures the wedge brackets 60 and the platform 40 to the spare tire 20. The ratcheting mechanism 32 is then actuated to tighten the at least one flexible strap 31 about the spare tire 20 to tighten the accessory mounting system 10 to the spare tire 20.

In preferred embodiments, the accessory mounting system 10 further includes a pair of platform height mounting brackets 80 (FIGS. 1 and 4) fixed at a top end 88 thereof with two or more of the mounting apertures 50 of the platform 40, and fixed at two or more vertical slots 85 thereof with the wedge brackets 60. As such, the height of the platform 40 with respect to the two wedge brackets 60 is adjustable.

Figure 5:
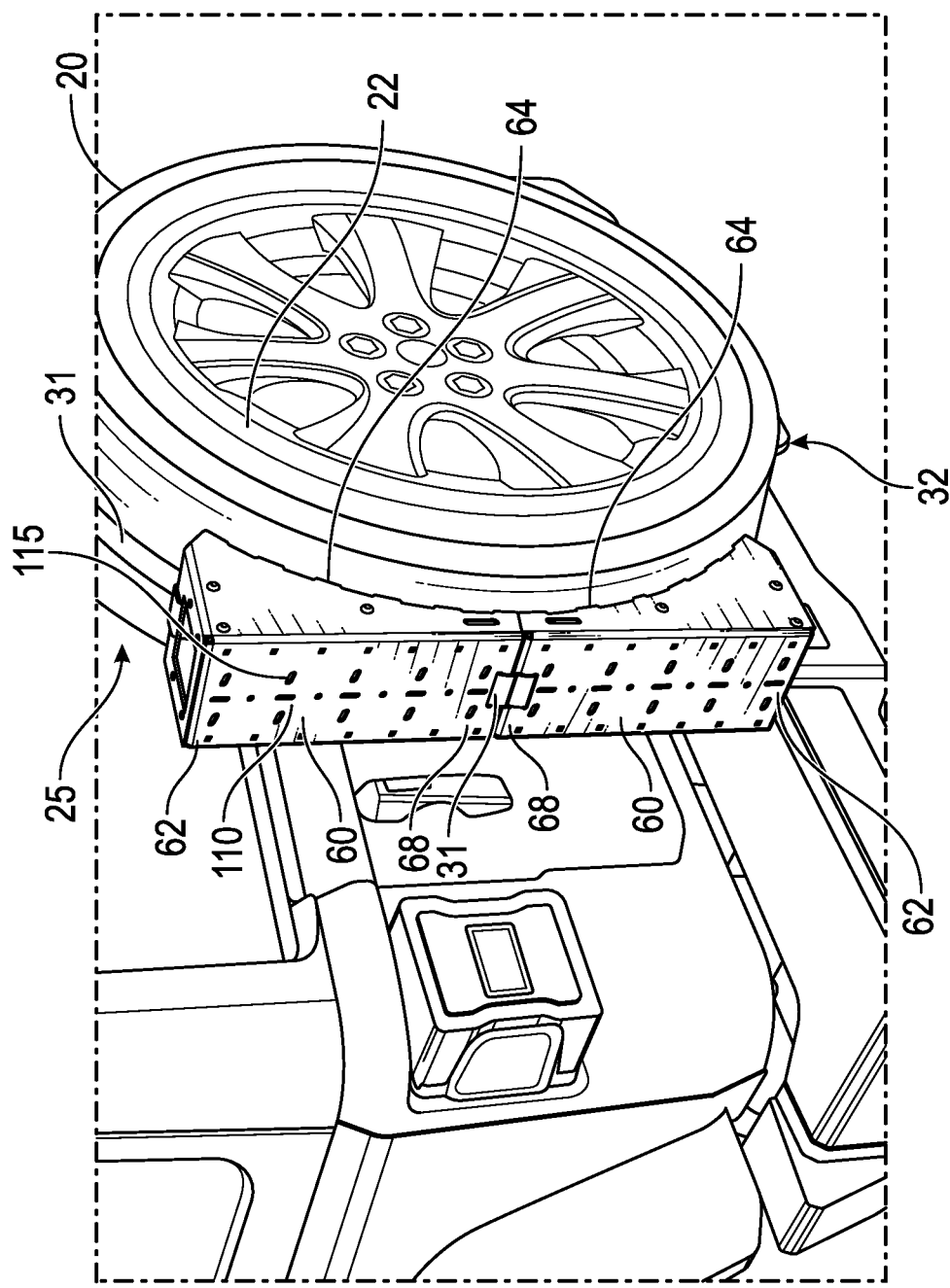
FIG. 5 is a side perspective view of a third embodiment of the invention.
Figure 6:
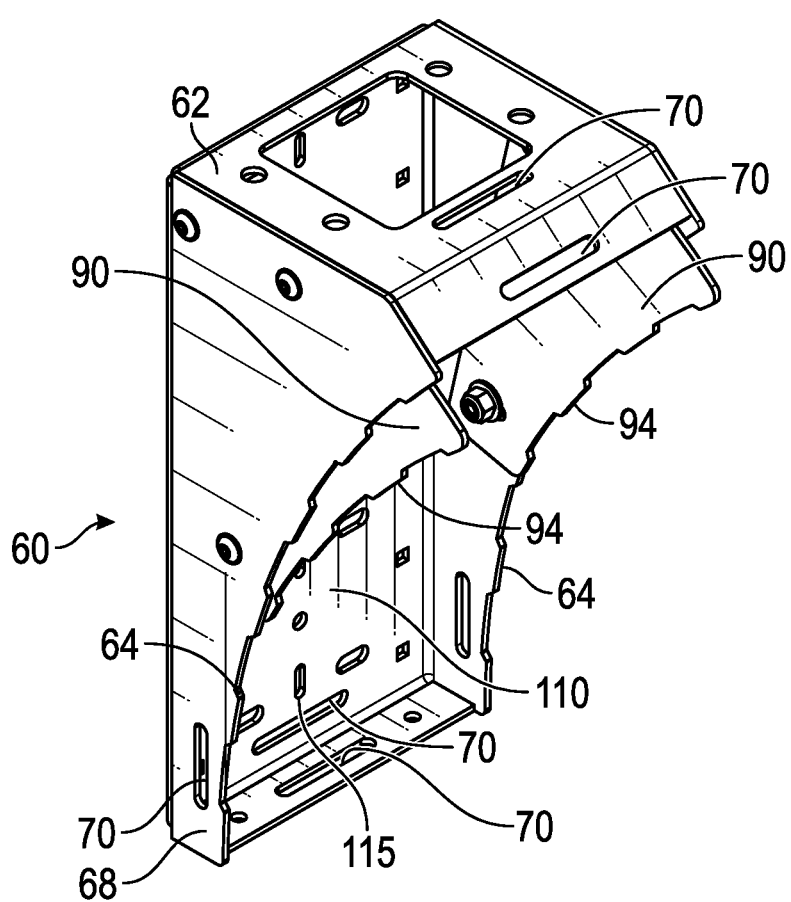
FIG. 6 is a side perspective view of one of the wedge brackets of the invention.
Figure 7:
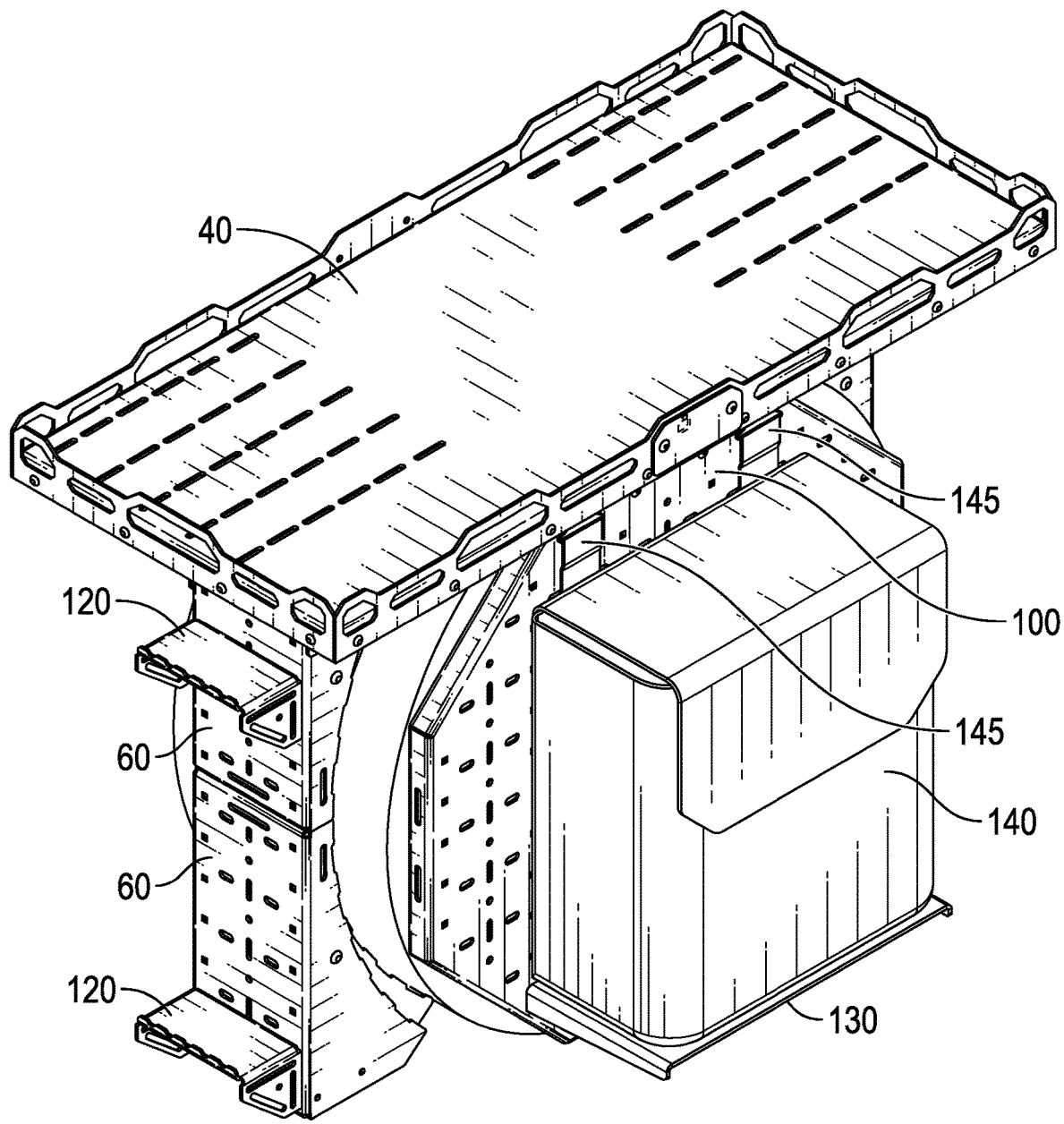
FIG. 7 is a top perspective view of a fourth embodiment of the invention.
Figure 8:
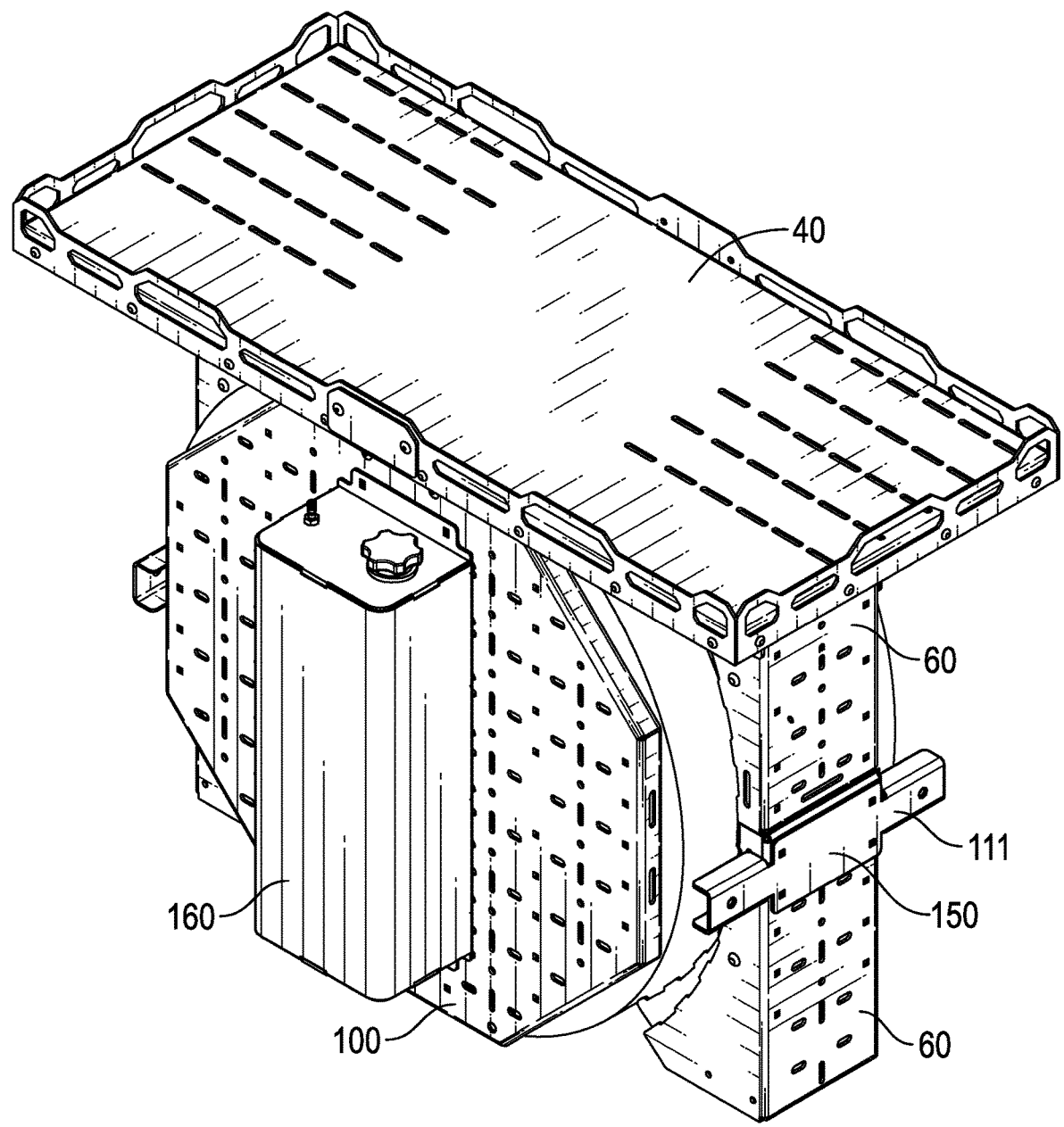
FIG. 8 is a top perspective view of a fifth embodiment of the invention.

In some embodiments, two additional of the wedge brackets 60 are included, each additional wedge bracket 60 inverted and mutually fixed at the second ends 68 thereof (FIGS. 3-5, 7 and 8). As such, the inside arched surfaces 64 of each wedge bracket 60 further engage the circumferential tread 25 of the spare tire 20. In such embodiments, a mounting bracket 150 may be fixed about the two second ends 68 of the attached wedge brackets 60. The mounting bracket 150 holds the wedge brackets together and provides a second mounting hole pattern 111 that comprises a plurality of the mounting holes 115, for attaching to various accessories (not shown).

Each wedge bracket 60 preferably further includes a fit adjustment plate 90 pivotally attached within the wedge bracket 60 at the inside arched surface 64 thereof. Each fit adjustment plate 90 includes a second inside arched surface 94 that can be pivoted inwardly or outwardly to match the curvature of the circumferential tread 25 of the spare tire 20.

Preferably the accessory mounting system 10 further includes a tire face mounting plate 100 (FIGS. 2-4, 7, and 8) that includes a front side 102, a rear side 108, and a peripheral edge 105 that includes a top side 109, a bottom side 101, a left side 104, and a right side 106. The top side 109 is fixed with the platform 40 at one or more of the mounting apertures 50 of the platform 40, so as to be positioned to substantially cover the front side 22 of the spare tire 20. Preferably the front side 102 and the rear side 108 of the tire face mounting plate 100 is shaped as an octagon.

Preferably the outside surface 66 of each wedge bracket 60 includes a mounting hole pattern 110 comprising a plurality of mounting holes 115. In such embodiments the accessory mounting system 10 may further include at least one step bracket 120 engageable with the mounting hole pattern 110 on each wedge bracket 60 such that the at least one step bracket 120 forms a step suitable for supporting a person thereon. The front side 102 of the tire face mounting plate 100 may also include the mounting hole pattern 110 comprising the plurality of mounting holes 115, such that a storage platform 130 (FIGS. 2 and 7) may be selectively attachable to the front side 102 of the tire face mounting plate 100 by engaging at least two of the mounting holes 115. A storage bag 140 may be further included, supported on the storage platform 130 and held to the tire face mounting plate 100 with a pair of storage bag straps 145 that engage at least four of the mounting holes 115. At least one water container 160 may be included, each adapted to engage the mounting hole pattern 110 of the tire face mounting plate 100 to secure the water container 160 to the tire face mounting plate 100.

A second mounting bracket 170 may be fixed with any of the wedge brackets 60, or the tire face mounting plate 100, at any of the mounting holes 115. The second mounting bracket 170 is adapted to hold various objects, such as a jack 16 (FIG. 2), or the like.

The platform 40, wedge brackets 60, fit adjustment plates 90, and tire face mounting plate 100 are all preferably made with a rigid metallic material, such as steel or aluminum. In some embodiments, the tire face mounting plate 100 is made with a rigid and strong plastic material.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. An accessory mounting system for a spare tire that is attached to a vehicle and exposed, the spare tire having a circumferential tread, a front side, and a back side, and for use with at least one ratchet strap that includes a flexible strap and a ratcheting mechanism adapted to tighten the flexible strap around the spare tire, the accessory mounting system comprising:
   a platform having a top surface, a bottom surface, and a peripheral edge, the platform further including a plurality of mounting apertures formed therethrough;
   a pair of wedge brackets each adapted at a first end thereof for fixing with two or more of the mounting apertures of the platform, and at an inside arched surface for fixing against the circumferential tread of the spare tire, each wedge bracket including a second end opposing the first end and two or more strap slots traversing an outside surface of the wedge bracket;
   whereby with the at least one flexible strap traversing the wedge brackets at the strap slots, the at least one flexible strap secures the wedge brackets and the platform to the spare tire, the ratcheting mechanism actuated to tighten the at least one flexible strap about the spare tire to tighten the accessory mounting system to the spare tire.

2. The accessory mounting system of claim 1 further including a pair of platform height mounting brackets fixed at a top end thereof with two or more of the mounting apertures of the platform, and fixed with the wedge brackets at two or more vertical slots, whereby the height of the platform with respect to the two wedge brackets is adjustable.

3. The accessory mounting system of claim 1 further including two additional of the wedge brackets, each additional wedge bracket inverted and mutually fixed at the second ends thereof such that the inside arched surfaces further engage the circumferential tread of the spare tire.

4. The accessory mounting system of claim 3 further including a mounting bracket fixed about the two second ends of the wedge bracket and the additional wedge bracket, the mounting bracket holding the wedge bracket and the additional edge bracket together and providing a second mounting hole pattern comprising a plurality of the mounting holes.

5. The accessory mounting system of claim 3 further including a second mounting bracket fixed with either the wedge bracket or the additional wedge bracket, the second mounting bracket fixed with at least two of the mounting holes of the mounting hole pattern on the outside surface of each wedge bracket.

6. The accessory mounting system of claim 1 wherein each wedge bracket further includes a fit adjustment plate pivotally attached within the wedge bracket and having a second inside arched surface that can be pivoted inwardly to match a curvature of the circumferential tread of the spare tire.

7. The accessory mounting system of claim 1 further including a tire face mounting plate that includes a front side, a rear side, and a peripheral edge that includes a top side, a bottom side, a left side, and a right side, the top side fixed with the platform and positioned so as to substantially cover the front side of the spare tire.

8. The accessory mounting system of claim 5 wherein the front side and rear side of the tire face mounting plate is shaped as an octagon.

9. The accessory mounting system of claim 7 wherein the front side of the tire face mounting plate includes a mounting hole pattern comprising a plurality of mounting holes, the accessory mounting system further including a storage platform selectively attachable to the front side of the tire face mounting plate by engaging at least two of the mounting holes.

10. The accessory mounting system of claim 9 further including a storage bag adapted to be supported on the storage platform and held to the tire face mounting plate with a pair of storage bag straps that engage at least four of the mounting holes.

11. The accessory mounting system of claim 9 further including at least one water container, each adapted to engage the mounting hole pattern of the tire face mounting plate to secure the water container to the tire face mounting plate.

12. The accessory mounting system of claim 1 wherein the outside surface of each wedge bracket includes a mounting hole pattern comprising a plurality of mounting holes, and further including at least one step bracket engageable with the mounting hole pattern on each wedge bracket, whereby the at least one step bracket forms a step suitable for supporting a person thereon.

13. An accessory mounting system for a spare tire that is attached to a vehicle and exposed, the spare tire having a circumferential tread, a front side, and a back side, and for use with at least one ratchet strap that includes a flexible strap and a ratcheting mechanism adapted to tighten the flexible strap around the spare tire, the accessory mounting system comprising:

a platform having a top surface, a bottom surface, and a peripheral edge, the platform further including a plurality of mounting apertures formed therethrough;

two wedge brackets each adapted at a first end thereof for fixing with two or more of the mounting apertures of the platform, and at an inside arched surface for fixing against the circumferential tread of the spare tire, each wedge bracket including a second end opposing the first end and two or more strap slots traversing an outside surface of the wedge bracket;

two additional wedge brackets, each additional wedge bracket inverted and mutually fixed at the second ends thereof such that the inside arched surfaces further engage the circumferential tread of the spare tire;

each wedge bracket further including a fit adjustment plate pivotally attached within the wedge bracket and having a second inside arched surface that can be pivoted inwardly to match a curvature of the circumferential tread of the spare tire;

a pair of platform height mounting brackets fixed at a top end thereof with two or more of the mounting apertures of the platform, and fixed with the wedge brackets at two or more vertical slots, whereby the height of the platform with respect to the two wedge brackets is adjustable;

a tire face mounting plate that includes a front side, a rear side, and a peripheral edge that includes a top side, a bottom side, a left side, and a right side, the top side fixed with the platform and positioned so as to substantially cover a front side of the spare tire, the front side and rear side of the tire face mounting plate being shaped as an octagon;

the outside surface of each wedge bracket including a mounting hole pattern comprising a plurality of mounting holes, and further including at least one step bracket engageable with the mounting hole pattern on each wedge bracket, whereby the at least one step bracket forms a step suitable for supporting a person thereon;

the front side of the tire face mounting plate including a mounting hole pattern comprising a plurality of mounting holes, the accessory mounting system further including a storage platform selectively attachable to the front side of the tire face mounting plate by engaging at least two of the mounting holes;

a storage bag adapted supported on the storage platform and held to the tire face mounting plate with a pair of storage bag straps that engage at least four of the mounting holes;

a mounting bracket fixed about the two second ends of the wedge bracket and the additional wedge bracket, the mounting bracket holding the wedge bracket and the additional edge bracket together and providing a second mounting hole pattern comprising a plurality of the mounting holes;

a second mounting bracket fixed with either the wedge bracket or the additional wedge bracket, the second mounting bracket fixed with at least two of the mounting holes of the mounting hole pattern on the outside surface of each wedge bracket; and at least one water container, each adapted to engage the mounting hole pattern of the tire face mounting plate to secure the water container to the tire face mounting plate;

whereby with the at least one flexible strap traversing the wedge brackets at the strap slots, the at least one flexible strap secures the wedge brackets and the platform to the spare tire, the ratcheting mechanism actuated to tighten the at least one flexible strap about the spare tire to tighten the accessory mounting system to the spare tire.

* * * * *